(12) United States Patent
Gu et al.

(10) Patent No.: US 9,414,147 B2
(45) Date of Patent: Aug. 9, 2016

(54) METHOD AND DEVICE FOR EARPHONE AND USB TO SHARE MICRO-USB INTERFACE

(75) Inventors: Jianliang Gu, Huizhou (CN); Zhan Gu, Huizhou (CN)

(73) Assignee: HUIZHOU TCL MOBILE COMMUNICATION CO., LTD., Huizhou, Guangdong Province (CN)

(*) Notice: Subject to any disclaimer, the term of this patent is extended or adjusted under 35 U.S.C. 154(b) by 442 days.

(21) Appl. No.: 13/807,004
(22) PCT Filed: Mar. 29, 2011
(86) PCT No.: PCT/CN2011/072237
§ 371 (c)(1),
(2), (4) Date: Dec. 26, 2012
(87) PCT Pub. No.: WO2012/009984
PCT Pub. Date: Jan. 26, 2012

(65) Prior Publication Data
US 2013/0101132 A1   Apr. 25, 2013

(30) Foreign Application Priority Data
Jul. 23, 2010 (CN) .......................... 2010 1 0237076

(51) Int. Cl.
*G06F 13/00* (2006.01)
*H04R 1/10* (2006.01)
(Continued)

(52) U.S. Cl.
CPC ......... *H04R 1/1041* (2013.01); *H04M 1/72527* (2013.01); *G06F 13/385* (2013.01); *G06F 13/409* (2013.01); *H04N 21/43632* (2013.01)

(58) Field of Classification Search
CPC .......... H04R 1/10; H04R 1/00; H04R 1/1041; H04M 1/02; H04M 1/725; H04M 1/72527; H04M 1/05; H04M 1/6083; H04M 1/6066; G06F 13/40; G06F 3/02; G06F 13/382; G06F 13/4022; G06F 13/385; G06F 1/1632; G06F 13/00; G06F 13/285; G06F 13/409; G06F 3/00; G06F 5/00; G06F 7/00; G06F 12/0646; G06F 9/4411; G06F 9/4413; G06F 9/4415; G06F 3/0629; G06F 13/387; G06F 13/10; G06F 9/445; G06F 3/0634; G06F 9/44536; G06F 11/3485; G06F 11/30; G06F 11/3003; G06F 11/3041; G06F 11/3466; G06F 3/0653; G06F 11/3051; G06F 11/3027; G06F 13/4068; G06F 13/4081; G06F 11/3079; G06F 11/3055; G06F 11/3409; G06F 11/3452; G06F 13/122; G06F 13/28; G06F 12/1081; G06F 13/4063; G06F 13/4027; G06F 13/4031; G06F 3/0635; G06F 5/06; G06F 13/1689; G06F 3/0659; G06F 13/4009; G06F 13/4013; G06F 3/0661; G06F 13/14; G06F 13/1605; G06F 13/20; G06F 13/36; G06F 13/4004; G06F 2213/00; G06F 2213/0002; G06F 2213/0004; G06F 2213/0006; G06F 2213/0008; H01R 31/06; H04N 21/43632; H04L 29/06; H04L 69/18; H04L 12/2602; H04L 43/00; H04L 41/12; G05B 19/054; G05B 2219/1157; H03M 1/00; H03M 1/001; H03M 1/12; H03M 2201/20; H03M 2201/30; G10K 2210/128; G10K 2210/1281; G10K 2210/12821; H04H 20/95; H04H 2201/11; H04H 2201/20; H04H 20/47
USPC ......... 381/74, 7, 85, 123, 81; 455/557, 556.1, 455/556.2, 558, 559, 575.1; 710/63, 64, 710/316, 33
See application file for complete search history.

(56) References Cited

U.S. PATENT DOCUMENTS 7,103,381 B1 * 9/2006 Wright ................ H04M 1/6083
455/556.1
7,280,854 B2 * 10/2007 Sugawara ............. G06F 1/1632
345/168
(Continued)

FOREIGN PATENT DOCUMENTS

CN        1832631 A     9/2006
CN      101030189 A     9/2007
(Continued)

*Primary Examiner* — Vivian Chin
*Assistant Examiner* — Ubachukwu Odunukwe
(74) *Attorney, Agent, or Firm* — Cheng-Ju Chiang

(57) ABSTRACT

The present disclosure generally relates to the technical field of mobile apparatuses, and discloses a method and a device for an earphone and a USB to share a Micro-USB interface. The method comprises the following steps of: A. detecting whether USB lines or earphone lines are plugged into the Micro-USB interface and generating a corresponding control signal to a control module by an interface detecting module; and B. selecting to activate a USB task or turn on an audio path according to the control signal by the control module. The present disclosure allows the earphone function and the USB function to be achieved through a single Micro-USB interface (i.e., the battery charger, the data lines and the earphone function are integrated together), and can be implemented in a simple structure and at a low cost.

6 Claims, 2 Drawing Sheets

(51) Int. Cl.
*H04M 1/725* (2006.01)
*G06F 13/38* (2006.01)
*G06F 13/40* (2006.01)
*H04N 21/4363* (2011.01)

(56) References Cited

U.S. PATENT DOCUMENTS 8,396,509 B2 * 3/2013 Chen .................... G06F 13/385
 381/81

2007/0239924 A1 * 10/2007 Foo ....................... G06F 13/385
 710/316
2009/0197640 A1 * 8/2009 Fa ........................ H04M 1/6066
 455/556.1

FOREIGN PATENT DOCUMENTS

CN 101645300 A 2/2010
CN 101917497 A 12/2010

* cited by examiner

METHOD AND DEVICE FOR EARPHONE AND USB TO SHARE MICRO-USB INTERFACE

CROSS REFERENCE TO RELATED APPLICATIONS

The present application is a 35 U.S.C. §371 National Phase conversion of International (PCT) Patent Application No. PCT/CN2011/072237, filed on Mar. 29, 2011, the disclosure of which is incorporated by reference herein. The PCT International Patent Application was published in Chinese.

FIELD OF THE INVENTION

The present disclosure generally relates to the technical field of mobile apparatuses, and more particularly, to a method and a device for an earphone and a USB to share a Micro-USB interface.

BACKGROUND OF THE INVENTION

Use of Micro-USB 5-pin interfaces is becoming increasingly widespread and they have become the standard interface for mobile phone designs in Europe and the United States. Correspondingly, the Mini-USB 10-pin interfaces which have been commonly used previously will be eliminated gradually. The Mini-USB 10-pin interfaces previously used can be shared by an earphone and a USB; however, it is difficult for the Micro-USB interfaces to be shared by the earphone and the USB as being limited by the number of pins. Usually, sharing of a Micro-USB interface can be achieved through addition of an analog switch device, but this leads to an additional cost.

Accordingly, there is still room for improvement and development of the prior art.

SUMMARY OF THE INVENTION

In view of the aforesaid shortcoming of the prior art, an objective of the present disclosure is to provide a method and a device for an earphone and a USB to share a Micro-USB interface, which allow the earphone and the USB to share the 5-pin Micro-USB interface and can be implemented in a simple structure and at a low cost.

The technical solutions of the present disclosure are as follows.

A device for an earphone and a USB to share a Micro-USB interface, comprising a Micro-USB interface module disposed on the device, the device further comprising a control module and an interface detecting module which are connected to the Micro-USB interface module, wherein the interface detecting module is configured to detect whether USB lines or earphone lines are plugged into the Micro-USB interface and generate a corresponding control signal to the control module; and the control module is connected to an audio circuit and a USB data transceiving circuit respectively and configured to select to activate a USB task or turn on an audio path according to the control signal.

Preferably, the device for an earphone and a USB to share a Micro-USB interface further comprises an audio circuit, a USB data transceiving circuit and a recharging circuit which are connected to the control module respectively, wherein when the interface detecting module detects that the USB lines are plugged into the Micro-USB interface, a first control signal is generated to the control module, and the control module controls the Micro-USB interface to be connected to the USB data transceiving circuit and/or the recharging circuit according to the first control signal so as to activate the USB task; and when the interface detecting module detects that the earphone lines are plugged into the Micro-USB interface, a second control signal is generated to the control module, and the control module controls the Micro-USB interface to be connected to the audio circuit according to the second control signal so as to turn on the audio path.

Preferably, the interface detecting module comprises a USB detecting unit connected to a VBUS terminal of the Micro-USB interface module, and the USB detecting unit is configured to, when the VBUS terminal of the Micro-USB interface module is detected to be at a high level, convert the high level into the first control signal for transmission to the control module.

Preferably, the interface detecting module further comprises a sound channel detecting unit connected to a USB_DP terminal of the Micro-USB interface module, and the sound channel detecting unit is configured to, when the USB_DP terminal of the Micro-USB interface module is detected to be at a low level, convert the low level into the second control signal for transmission to the control module.

Preferably, both the control module and the interface detecting module are integrated into one chip and implemented through software.

Preferably, during the USB task is activated, a left sound channel output and a right sound channel output of the earphone are set into a mute mode through software control of the control module.

Preferably, when the earphone operates after the audio path is turned on, signals at a USB_DM terminal and a USB_DP terminal of the mobile phone are set into a high-resistance status.

Preferably, the pin of an ID terminal of the Micro-USB interface is used as a microphone interface of the earphone.

A method for an earphone and a USB to share a Micro-USB interface, comprising the following steps of:

A. detecting whether USB lines or earphone lines are plugged into the Micro-USB interface and generating a corresponding control signal to a control module by an interface detecting module; and B. selecting to activate a USB task or turn on an audio path according to the control signal by the control module.

Preferably, the step A comprises the following steps:

A1. when the USB lines are plugged into a Micro-USB interface module, the interface detecting module detects that a VBUS terminal of the Micro-USB interface module is at a high level and converts the high level into a first control signal for transmission to the control module; and A2. when the earphone lines are plugged into the Micro-USB interface module, the interface detecting module detects that a USB-DP terminal of the Micro-USB interface module is at a low level and converts the low level into a second control signal for transmission to the control module.

Preferably, the step B comprises the following steps:

B1. when the control module receives the first control signal which indicates that the VBUS terminal of the Micro-USB interface module is at the high level, the control module controls to activate the USB task; and B2. when the control module receives the second control signal which indicates that the USB_DP terminal of the Micro-USB interface module is at the low level, the control module controls to turn on the audio path.

The method and the device for an earphone and a USB to share a Micro-USB interface according to the present disclosure allow the earphone function and the USB function to be achieved through a single Micro-USB interface (i.e., the battery charger, the data lines and the earphone function are integrated together), and can be implemented in a simple structure and at a low cost.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

The present disclosure provides a method and a device for an earphone and a USB to share a Micro-USB interface. To make the objectives, technical solutions and advantages of the present disclosure clearer, the present disclosure will be further detailed hereinbelow with reference to the attached drawings and embodiments thereof. It shall be understood that, the embodiments described herein are only intended to illustrate but not to limit the present disclosure.

Figure 2:
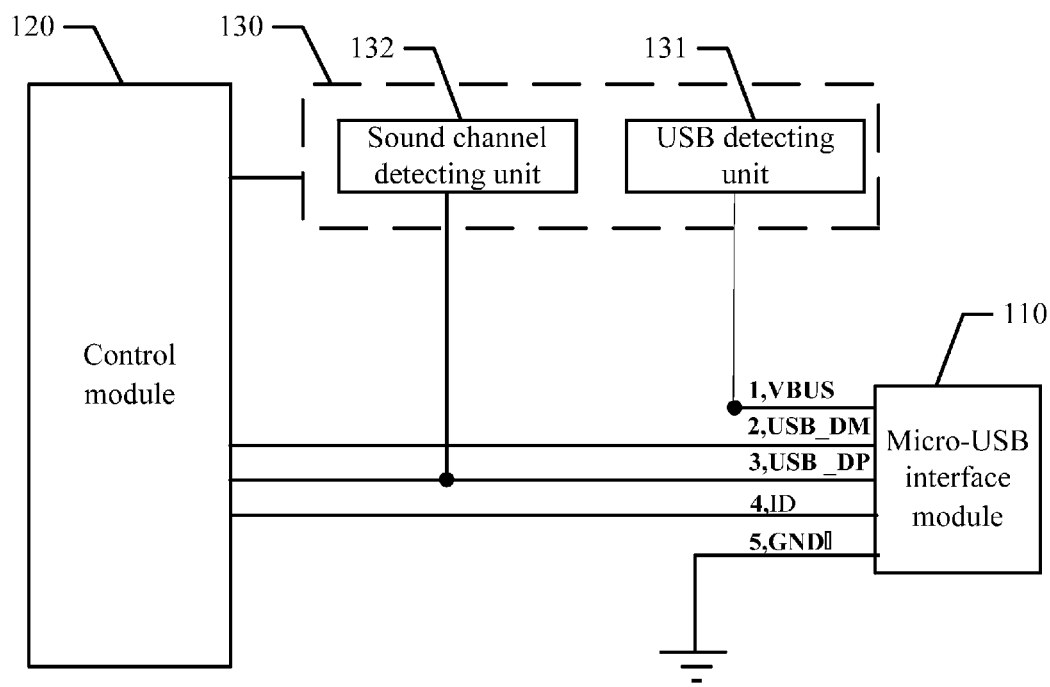
FIG. 2 is a schematic view illustrating connections of an interface detecting module according to the embodiment of the present disclosure.

The standard Micro-USB interface comprises 5 pins. In the present disclosure, as shown in FIG. 2, the 5 pins of the Micro-USB interface are respectively defined as follows:

Pin 1 (the first pin): Vbus terminal (USB power supply);

Pin 2 (the second pin): USB_DM terminal (also used as a left sound channel of an earphone);

Pin 3 (the third pin): USB_DP terminal (also used as a right sound channel of the earphone);

Pin 4 (the fourth pin): ID terminal (also used as a microphone of the earphone); and Pin 5 (the fifth pin): GND terminal.

Figure 1:
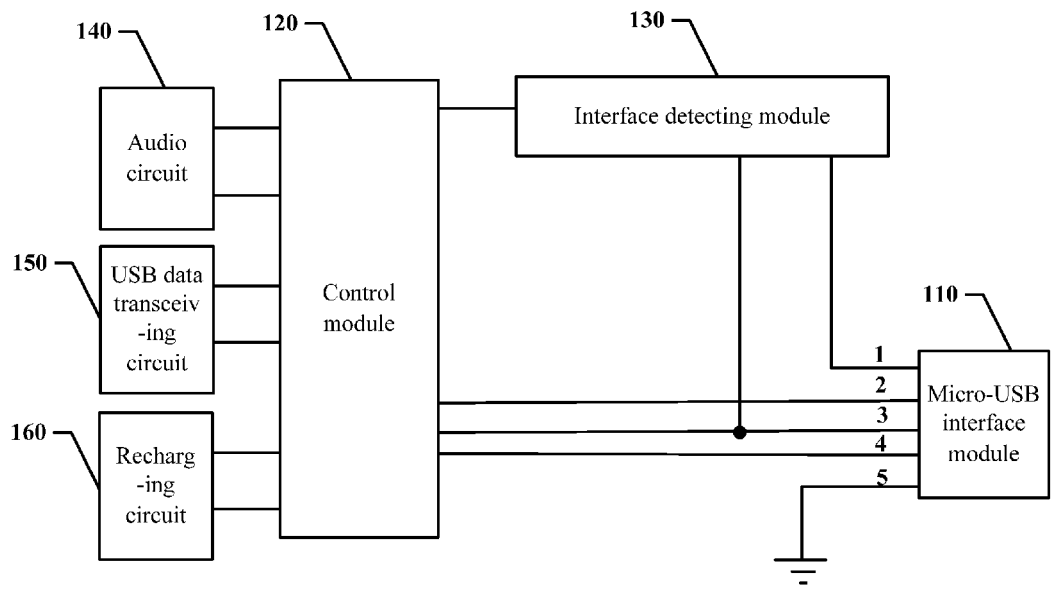
FIG. 1 is a schematic block diagram of a device for an earphone and a USB to share a Micro-USB interface according to an embodiment of the present disclosure.

As shown in FIG. 1, a device for an earphone and a USB to share a Micro-USB interface according to an embodiment of the present disclosure comprises a Micro-USB interface module 110 disposed on the device. The Micro-USB interface module 110 is a standard Micro-USB interface, and comprises a male Micro-USB and a female Micro-USB.

The device of the present disclosure further comprises a control module 120 and an interface detecting module 130 which are connected to the Micro-USB interface module 110, and further comprises an audio circuit 140, a USB data transceiving circuit 150 and a recharging circuit 160 which are connected to the control module 120 respectively.

The interface detecting module 130 is configured to detect whether USB lines or earphone lines are plugged into the Micro-USB interface 110 and generate a corresponding control signal to the control module 120. In order to detect the USB lines or the earphone lines, the interface detecting module 130 may comprise a USB detecting unit 131 and a sound channel detecting unit 132 in a practical implementation, as shown in FIG. 2.

The USB detecting unit 131 is connected to a VBUS terminal of the Micro-USB interface module 110, and is configured to, when the VBUS terminal of the Micro-USB interface module 110 is detected to be at a high level, convert the high level into a first control signal for transmission to the control module 120.

The sound channel detecting unit 132 is connected to a USB_DP terminal of the Micro-USB interface module 110, and is configured to, when the USB_DP terminal of the Micro-USB interface module is detected to be at a low level, convert the low level into a second control signal for transmission to the control module 120.

As shown in FIG. 1, the control module 120 is configured to select to activate a USB task or turn on an audio path according to the control signal. The control module 120 is implemented according to the following principle:

B1. when the control module receives the first control signal which indicates that the VBUS terminal of the Micro-USB interface module is at the high level and which is transmitted from the interface detecting module, the control module controls to activate the USB task; and B2. when the control module receives the second control signal which indicates that the USB_DP terminal of the Micro-USB interface module is at the low level and which is transmitted from the interface detecting module, the control module controls to turn on the audio path.

For the device for an earphone and a USB to share a Micro-USB interface according to this embodiment of the present disclosure, both the control module 120 and the interface detecting module may be integrated into one chip and implemented through software. As shown in FIG. 1 and FIG. 2, the implementation principle is as follows: when the interface detecting module 130 detects that the USB lines are plugged into the Micro-USB interface 110, the interface detecting module 130 detects that the VBUS terminal of the Micro-USB interface module 110 is at the high level and converts the high level into the first control signal for transmission to the control module 120; and then, the control module 120 controls the Micro-USB interface to be connected to the USB data transceiving circuit 150 and/or the recharging circuit 160 according to the first control signal so as to activate the USB task. Thereby, the USB data transceiving function and/or the recharging function are achieved.

That is, if the USB lines are plugged by a user, a voltage of 5 V inputted from a PC terminal will appear at the VBUS terminal. The device of the present disclosure detects and identifies this voltage as plugging of the USB lines, and then a USB program is run to activate the USB task for USB data transceiving and/or recharging operations. During the USB data transceiving and/or recharging operations, a left sound channel output and a right sound channel output of the earphone are set into a mute mode through software control of the control module 120, and this can reduce the influence of the left sound channel and the right sound channel on the USB data communication.

On the other hand, when the interface detecting module 130 detects that the earphone lines are plugged into the Micro-USB interface 110, the second control signal is generated to the control module 120 (i.e., the interface detecting module 130 detects that the USB-DP terminal of the Micro-USB interface module 110 is at the low level and converts the low level into the second control signal for transmission to the control module 120); and the control module 120 controls the Micro-USB interface 110 to be connected to the audio circuit 140 according to the second control signal so as to turn on the audio path (i.e., turn on a left sound channel path and a right sound channel path of the earphone). Thereby, the audio reception function is achieved.

That is, if the earphone lines are plugged by the user, then because a loudspeaker of the earphone has a nominal resistance of 32 ohm, the voltage level of the USB-DP terminal will be pulled down to a low level by the resistance. The device of the present disclosure detects and identifies this low level as plugging of the earphone lines, and then the left sound channel path and the right sound channel path of the earphone are turned on.

When the earphone operates after the audio path is turned on, signals at a USB_DM terminal and a USB_DP terminal of the mobile phone are set into a high-resistance status, and this can reduce the influence of the USB_DM terminal and the USB_DP terminal on the left sound channel signal and the right sound channel signal of the earphone.

Common devices such as mobile phones are all used as USB clients rather than hosts, so the pin of the ID terminal of the Micro-USB interface may be omitted. In the present disclosure, the pin of the ID terminal of the Micro-USB interface is also used as a microphone interface of the earphone.

As can be seen from the above, by connecting the earphone lines to the Micro-USB interface directly and through software control, the present disclosure can omit one analog switch integrated circuit (IC) to reduce the cost. Thereby, the present disclosure allows the earphone function and the USB function to be achieved through a single Micro-USB interface (i.e., the battery charger, the data lines and the earphone function are integrated together), and can be implemented in a simple structure and at a low cost.

Figure 3:
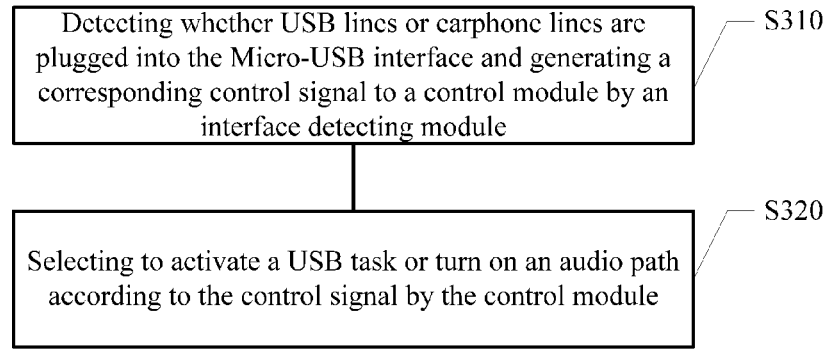
FIG. 3 is a flowchart diagram of a method for an earphone and a USB to share a Micro-USB interface according to an embodiment of the present disclosure.
Figure 3A:
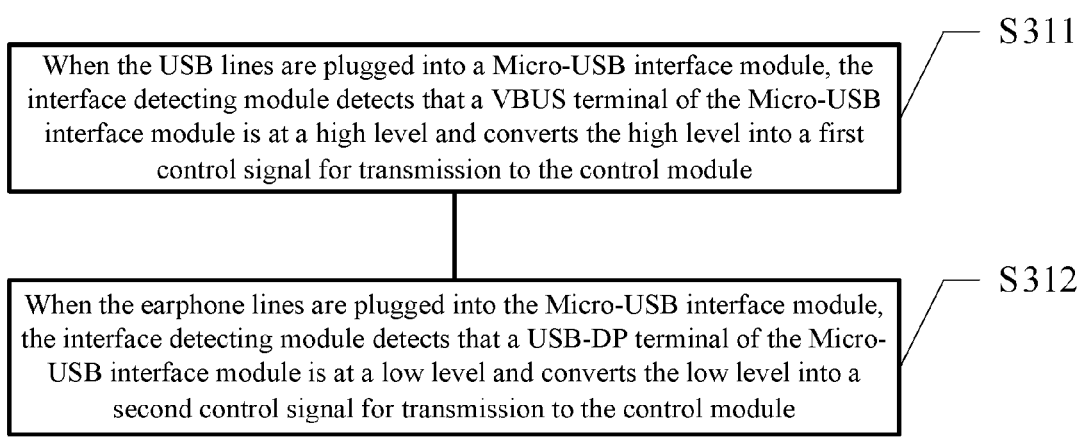
FIG. 3a is a flowchart diagram of a step S310 of the method for an earphone and a USB to share a Micro-USB interface as shown in FIG. 3 according to an embodiment of the present disclosure.
Figure 3B:
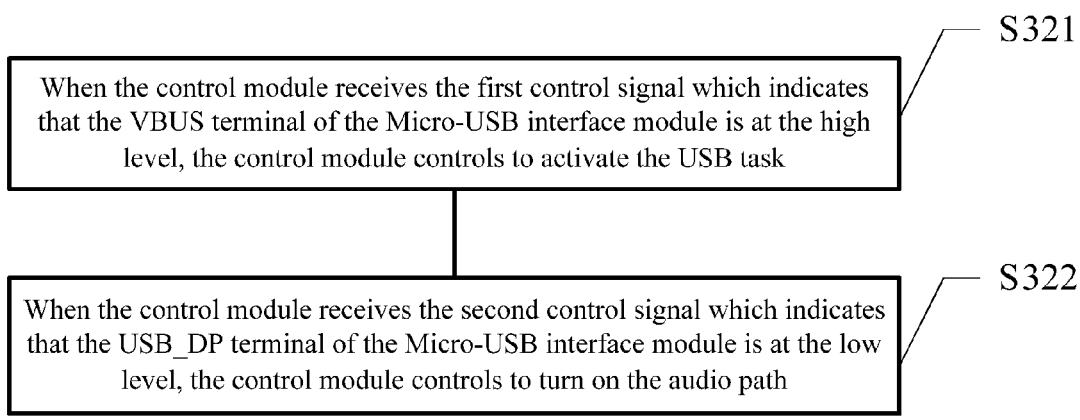
FIG. 3b is a flowchart diagram of a step S320 of the method for an earphone and a USB to share a Micro-USB interface as shown in FIG. 3 according to an embodiment of the present disclosure.

On the basis of the aforesaid device, an embodiment of the present disclosure further provides a method for an earphone and a USB to share a Micro-USB interface. As shown in FIGS. 3, 3a and 3b, the method comprises the following steps of:

step S310: detecting whether USB lines or earphone lines are plugged into the Micro-USB interface and generating a corresponding control signal to a control module by an interface detecting module; and step S320: selecting to activate a USB task or turn on an audio path according to the control signal by the control module.

In a further embodiment, the step S310 comprises the following steps:

step S311: when the USB lines are plugged into a Micro-USB interface module, the interface detecting module detects that a VBUS terminal of the Micro-USB interface module is at a high level and converts the high level into a first control signal for transmission to the control module; and step S312: when the earphone lines are plugged into the Micro-USB interface module, the interface detecting module detects that a USB-DP terminal of the Micro-USB interface module is at a low level and converts the low level into a second control signal for transmission to the control module.

The step S320 comprises the following steps:

step S321: when the control module receives the first control signal which indicates that the VBUS terminal of the Micro-USB interface module is at the high level, the control module controls to activate the USB task; and step S322: when the control module receives the second control signal which indicates that the USB_DP terminal of the Micro-USB interface module is at the low level, the control module controls to turn on the audio path.

The method and the device for an earphone and a USB to share a Micro-USB interface according to the present disclosure allow the earphone function and the USB function to be achieved through a single Micro-USB interface (i.e., the battery charger, the data lines and the earphone function are integrated together), and can be implemented in a simple structure and at a low cost.

It shall be appreciated that, the present disclosure is only described exemplarily in the aforesaid embodiments. However, those skilled in the art can make various modifications and variations on the present disclosure after reading this specification without departing from the spirit and scope of the present disclosure, and all these modifications and variations shall all be covered within the scope of the appended claims.

What is claimed is:

1. A device for an earphone and a universal series bus (USB) to share a Micro-USB interface, comprising a Micro-USB interface module disposed on the device, the device further comprising a control module and an interface detecting module which are connected to the Micro-USB interface module, wherein the Micro-USB interface module is an interface configured to be directly connected to USB lines or earphone lines, and consisted of a first pin, a second pin, a third pin, a fourth pin and a fifth pin;

wherein the first pin is used as a VBUS terminal, the second pin is used as a USB_DM terminal and also used as a left sound channel, the third pin is used as a USB_DP terminal and also used as a right sound channel, the fourth pin is used as an ID terminal and also used as a microphone, and the fifth pin is used as a GND terminal;

wherein the interface detecting module is configured to detect whether USB lines or earphone lines are plugged into the Micro-USB interface and generate a corresponding control signal to the control module; and the control module is configured to select to activate a USB task or turn on an audio path according to the control signal, wherein the interface detecting module comprises a USB detecting unit and a sound channel detecting unit independent from the USB detecting unit;

the USB detecting unit is directly connected to the VBUS terminal of the Micro-USB interface module, such that when the VBUS terminal of the Micro-USB interface module is detected to be at a high level, the USB detecting unit converts the high level into a first control signal and transmits the first control signal to the control module, and the control module controls the Micro-USB interface to be connected to a USB data transceiving circuit and/or a recharging circuit of the device according to the first control signal so as to activate the USB task;

the sound channel detecting unit is directly connected to the USB DP terminal of the Micro-USB interface module, such that when the USB DP terminal of the Micro-USB interface module is detected to be at a low level, the sound channel detecting unit converts the low level into a second control signal and transmits the second control signal to the control module, and the control module controls the Micro-USB interface to be connected to an audio circuit of the device according to the second control signal so as to turn on the audio path.

2. A method for an earphone and a universal series bus (USB) to share a Micro-USB interface, wherein the Micro- USB interface is an interface configured to be directly connected to USB lines or earphone lines, and consisted of a first pin, a second pin, a third pin, a fourth pin and a fifth pin; wherein the first pin is used as a VBUS terminal, the second pin is used as a USB_DM terminal and also used as a left sound channel, the third pin is used as a USB_DP terminal and also used as a right sound channel, the fourth pin is used as an ID terminal and also used as a microphone, and the fifth pin is used as a GND terminal; the method comprises the following steps of:

- A. detecting whether USB lines or earphone lines are plugged into the Micro-USB interface and generating a corresponding control signal to a control module by an interface detecting module, wherein the interface detecting module comprises a USB detecting unit and a sound channel detecting unit independent from the USB detecting unit, the USB detecting unit is connected to the VBUS terminal of the Micro-USB interface, and the sound channel detecting unit is connected to the USB DP terminal of the Micro-USB interface; and
- B. selecting to activate a USB task or turn on an audio path according to the control signal by the control module;

wherein the step A comprises the following steps:

- A1. when the USB lines are plugged into the Micro-USB interface, the interface detecting module detects that the VBUS terminal of the Micro-USB interface is at a high level and converts the high level into a first control signal for transmission to the control module; and
- A2. when the earphone lines are plugged into the Micro-USB interface, the interface detecting module detects that a USB-DP terminal of the Micro-USB interface is at a low level and converts the low level into a second control signal for transmission to the control module.

3. The method for an earphone and a USB to share a Micro-USB interface of claim 2, wherein the step B comprises the following steps:

- B 1. when the control module receives the first control signal which indicates that the VBUS terminal of the Micro-USB interface is at the high level, the control module controls to activate the USB task; and
- B2. when the control module receives the second control signal which indicates that the USBDP terminal of the Micro-USB interface is at the low level, the control module controls to turn on the audio path.

4. The device for an earphone and a USB to share a Micro-USB interface of claim 1, wherein: both the control module and the interface detecting module are integrated into one chip and implemented through software.

5. The device for an earphone and a USB to share a Micro-USB interface of claim 4, wherein: during the USB task is activated, a left sound channel output and a right sound channel output of the earphone are set into a mute mode through software control of the control module.

6. The device for an earphone and a USB to share a Micro-USB interface of claim 4, wherein: when the earphone operates after the audio path is turned on, signals at a USB_DM terminal and a USB_DP terminal of the mobile phone are set into a high-resistance status.

* * * * *